(12) United States Patent
Hancock et al.

(10) Patent No.: US 7,237,847 B2
(45) Date of Patent: Jul. 3, 2007

(54) AUTOMOTIVE SEAT WITH ACTIVE BACK

(75) Inventors: Robert L. Hancock, Ann Arbor, MI (US); Terrence M. Cussen, Englewood, CO (US); Lance E. Larsen, Southfield, MI (US); David M. Hensel, Canton, MI (US); Joseph W. McElroy, Ann Arbor, MI (US); Michael R. Benzing, Britton, MI (US); William H. Jones, Lake Orion, MI (US)

(73) Assignee: Johnson Controls Technology Company, Holland, MI (US)

( * ) Notice: Subject to any disclaimer, the term of this patent is extended or adjusted under 35 U.S.C. 154(b) by 174 days.

(21) Appl. No.: 10/504,355

(22) PCT Filed: Feb. 11, 2003

(86) PCT No.: PCT/US03/04210

§ 371 (c)(1),
(2), (4) Date: Mar. 10, 2005

(87) PCT Pub. No.: WO03/068557

PCT Pub. Date: Aug. 21, 2003

(65) Prior Publication Data

US 2005/0179290 A1    Aug. 18, 2005

Related U.S. Application Data

(60) Provisional application No. 60/356,836, filed on Feb. 12, 2002, provisional application No. 60/356,277, filed on Feb. 12, 2002.

(51) Int. Cl.
*B60N 2/10* (2006.01)
*B60N 2/12* (2006.01)

(52) U.S. Cl. .............................. 297/452.56; 297/284.4; 297/362.11

(58) Field of Classification Search ........... 297/452.56, 297/284.4, 362.11
See application file for complete search history.

(56) References Cited

U.S. PATENT DOCUMENTS 2,843,195 A * 7/1958 Barvaeus .................. 297/284.4
3,695,706 A * 10/1972 Basher et al. ........... 297/452.56
3,762,769 A * 10/1973 Poschl ..................... 297/284.4

(Continued)

FOREIGN PATENT DOCUMENTS

DE    40 34 588 A1    5/1992

(Continued)

*Primary Examiner*—Rodney B. White
(74) *Attorney, Agent, or Firm*—Foley & Lardner LLP

(57) ABSTRACT

A vehicle seat for use by an occupant in a vehicle, for example an automobile. The vehicle seat comprises a seat base (12) coupled to a support structure (6) of the vehicle. A back frame (40) including side members (41, 43), the back frame further includes a second transverse member (46) coupled to the first and second side members, wherein the side members each have a lower end pivotably coupled to the seat base. A compliant back (60) is operably connected at an upper end to the second transverse member (46) and operably connected at a lower portion proximate the lower ends of the side members, and may include a biasing mechanism. The seat may also include a tuberosity pivot (54) coupled to the back frame (40) and the seat base (12), which pivot may be motorized.

49 Claims, 8 Drawing Sheets

U.S. PATENT DOCUMENTS

| | | | | |
|---|---|---|---|---|
| 4,456,861 | A | 6/1984 | Ratzel et al. | |
| 4,547,718 | A | 10/1985 | Ratzel et al. | |
| 4,580,840 | A * | 4/1986 | Cunningham et al. | 297/452.56 X |
| 4,583,783 | A * | 4/1986 | Kanai | 297/452.56 |
| 4,601,514 | A * | 7/1986 | Meiller | 297/284.4 |
| 4,689,537 | A | 8/1987 | Mizuta et al. | |
| 4,717,203 | A | 1/1988 | Meiller | |
| 4,852,934 | A | 8/1989 | Yasuda et al. | |
| 4,881,020 | A | 11/1989 | Hida et al. | |
| 5,026,116 | A * | 6/1991 | Dal Monte | 297/284.4 X |
| 5,038,085 | A | 8/1991 | Gmeiner et al. | |
| 5,050,930 | A * | 9/1991 | Schuster et al. | 297/284.4 |
| 5,126,640 | A | 6/1992 | Leroy | |
| 5,174,526 | A * | 12/1992 | Kanigowski | 297/284.4 |
| 5,207,451 | A | 5/1993 | Furuse et al. | |
| 5,249,839 | A | 10/1993 | Falks et al. | |
| 5,253,138 | A | 10/1993 | Droulon et al. | |
| 5,292,178 | A * | 3/1994 | Loose et al. | 297/362.11 X |
| 5,295,730 | A * | 3/1994 | Rees | 297/362.11 X |
| 5,319,248 | A | 6/1994 | Endou | |
| 5,328,248 | A * | 7/1994 | Nishiyama | 297/452.56 |
| 5,385,388 | A | 1/1995 | Falks et al. | |
| 5,397,164 | A | 3/1995 | Schuster et al. | |
| 5,435,624 | A * | 7/1995 | Bray et al. | 297/362.11 |
| 5,452,868 | A * | 9/1995 | Kanigowski | 297/284.4 X |
| 5,497,326 | A | 3/1996 | Berland et al. | |
| 5,498,063 | A | 3/1996 | Schuster et al. | |
| 5,536,069 | A * | 7/1996 | Bray et al. | 297/362.11 |
| 5,597,205 | A * | 1/1997 | Glance et al. | 297/362.11 X |
| 5,602,425 | A | 2/1997 | Wilhelmi et al. | |
| 5,626,390 | A | 5/1997 | Schuster et al. | |
| 5,633,898 | A | 5/1997 | Kishigami et al. | |
| 5,717,300 | A | 2/1998 | Baloche et al. | |
| 5,748,473 | A | 5/1998 | Breed et al. | |
| 5,772,281 | A * | 6/1998 | Massara | 297/284.4 |
| 5,775,773 | A | 7/1998 | Schuster et al. | |
| 5,812,399 | A | 9/1998 | Judic et al. | |
| 5,864,105 | A | 1/1999 | Andrews | |
| 5,871,258 | A | 2/1999 | Battey et al. | |
| 5,887,949 | A | 3/1999 | Kodaverdian | |
| 5,909,923 | A | 6/1999 | DeKraker | |
| 5,975,634 | A | 11/1999 | Knoblock et al. | |
| 5,979,984 | A | 11/1999 | DeKraker et al. | |
| 6,003,941 | A | 12/1999 | Schuster, Sr. et al. | |
| 6,055,473 | A | 4/2000 | Zwolinski et al. | |
| 6,064,932 | A | 5/2000 | François | |
| 6,079,785 | A | 6/2000 | Peterson et al. | |
| 6,086,153 | A * | 7/2000 | Heidmann et al. | 297/300.1 |
| 6,088,640 | A | 7/2000 | Breed | |
| 6,116,695 | A | 9/2000 | Heidmann et al. | |
| 6,157,372 | A | 12/2000 | Blackburn et al. | |
| 6,179,384 | B1 * | 1/2001 | DeKraker et al. | 297/284.4 |
| 6,195,603 | B1 | 2/2001 | Gauger et al. | |
| 6,220,661 | B1 | 4/2001 | Peterson | |
| 6,231,125 | B1 * | 5/2001 | Maeda et al. | 297/452.56 |
| 6,254,126 | B1 | 7/2001 | Bauer et al. | |
| 6,254,187 | B1 | 7/2001 | Schuster, Sr. et al. | |
| 6,318,800 | B1 | 11/2001 | DeKraker | |
| 6,349,992 | B1 * | 2/2002 | Knoblock et al. | 297/284.4 X |
| 6,367,877 | B1 * | 4/2002 | Knoblock et al. | 297/284.4 X |
| 6,378,949 | B1 * | 4/2002 | Maeda et al. | 297/452.56 |
| 6,382,719 | B1 * | 5/2002 | Heidmann et al. | 297/284.4 X |
| 6,394,545 | B2 * | 5/2002 | Knoblock et al. | 297/284.4 |
| 6,394,546 | B1 * | 5/2002 | Knoblock et al. | 297/284.4 X |
| 6,394,548 | B1 | 5/2002 | Battey et al. | |
| 6,394,549 | B1 | 5/2002 | DeKraker et al. | |
| 6,428,104 | B1 * | 8/2002 | Sakamoto et al. | 297/362.11 |
| 6,435,618 | B1 * | 8/2002 | Kawasaki | 297/452.56 |
| 6,460,934 | B1 | 10/2002 | Langer et al. | |
| 6,616,228 | B2 * | 9/2003 | Heidmann | 297/284.4 |
| 6,676,218 | B2 * | 1/2004 | Fujita et al. | 297/452.56 X |
| 6,677,720 | B2 | 1/2004 | Fraser | |
| 6,682,144 | B2 * | 1/2004 | Klingler | 297/284.4 |
| 6,722,742 | B2 * | 4/2004 | Potes et al. | 297/452.56 |
| 6,749,261 | B2 * | 6/2004 | Knoblock et al. | 297/284.4 |
| 6,991,291 | B2 * | 1/2006 | Knoblock et al. | 297/284.4 |
| 7,114,777 | B2 * | 10/2006 | Knoblock et al. | 297/284.4 X |
| 7,118,178 | B2 * | 10/2006 | Daniels | 297/362.11 X |
| 2002/0089223 | A1* | 7/2002 | Yu | 297/362.11 |
| 2002/0195853 | A1* | 12/2002 | Heidmann | 297/284.4 |
| 2004/0124679 | A1* | 7/2004 | Teppo et al. | 297/284.4 |

FOREIGN PATENT DOCUMENTS

| | | | | |
|---|---|---|---|---|
| DE | 196 49 587 A1 | | 6/1998 | |
| DE | 198 28 217 A1 | | 7/1999 | |
| EP | 423079 A1 | * | 4/1991 | 297/284.4 |
| EP | 458000 A1 | * | 11/1991 | 297/284.4 |
| GB | 2013487 A | * | 8/1979 | 297/284.4 |
| JP | 58-76336 A | | 5/1983 | |
| JP | 63232046 A | * | 9/1988 | 297/284.4 |
| WO | WO 2004/062961 A1 | | 7/2004 | |

\* cited by examiner

US 7,237,847 B2

AUTOMOTIVE SEAT WITH ACTIVE BACK

CROSS-REFERENCE TO RELATED PATENT APPLICATIONS

This application claims the benefit of U.S. Provisional Application No. 60/356,277, filed Feb. 12, 2002, entitled Vehicle Seat Having An Electronic Control System and U.S. Provisional Application No. 60/356,836 filed Feb. 12, 2002, entitled Automotive Seat With Live Back and incorporated herein by reference.

BACKGROUND OF THE INVENTION.

The present invention relates generally to the field of automotive seats and more particularly relates to an automotive seat having a seat back having a flexible member.

Outside of the automotive seat industry, it is known to provide a chair having a compliant seat back pivoted to a seat back frame, assembly in at least two vertically spaced-apart locations for providing a controlled curvilinear flexure support. For an example of the above, see U.S. Pat. Nos. 5,871,258; 5,909,923; 5,975,634; 5,979,984; 6,079,785; 6,086,153; 6,220,661 the disclosures of which are incorporated herein by reference.

It is known to provide an automotive seat having a reclineable back. It is also known to provide an automotive seat having a reclineable back and an independently movable seat base. It is also known to provide an automotive seat having an adjustable lumbar consisting of a flexible member having a first end anchored and a second end moved with respect to the first end to cause the flexible member to vary its shape to provide adjustable support within the lumbar region of an automotive seat. For example, U.S. Pat. Nos. 5,397,164; 5,498,063; 5,626,390; 5,775,773; 6,003,941; and 6,254,187, the disclosures of which are incorporated herein by reference.

Notwithstanding the known devices, there remains a significant need to develop an automotive seat which is capable of better supporting an occupant of the seat. In particular, there remains a need to provide an automotive seat which is capable of providing continuous support for a plurality of sizes of seat occupants. Further, there remains a need to provide an automotive seat that includes a flexible seat back that automatically adjusts to an occupant's unique shape and posture including being able to adjust to the occupant's changing shape and posture. Further, there remains a need to provide an automotive seat having a seat back that is capable of providing an occupant with individualized support and which is capable of permitting back and spinal motion.

There also remains a need to provide an automotive seat having a seat back that can pivot more naturally in relation to an occupant and which is capable of better keeping the a lumbar support in contact with the occupant.

It is desirable to provide an automotive seat that provides one or more of these or other advantageous features. Other features and advantages will be made apparent from the present description. The teachings disclosed extend to those embodiments that fall within the scope of the appended claims, regardless of whether they accomplish one or more of the aforementioned needs.

SUMMARY OF THE INVENTION

One embodiment of the invention relates to a vehicle seat for use by an occupant in a vehicle. The vehicle seat comprises a seat base coupled to a support structure of the vehicle. A back frame including an upper transverse member, a first side member and a second side member wherein the upper transverse member interconnects each of the side members at an upper end of the back frame, the back frame further includes a second transverse member coupled to the first and second side members, a spaced distance from the first transverse member, wherein the first and second side members each have a lower end pivotably coupled to the seat base. A compliant back is operably connected at an upper end to the second transverse member and operably connected at a lower portion proximate the lower ends of the first and second side members. Another embodiment provides the compliant back being coupled to the second transverse member by at least one pivot member such that the upper portion of the compliant back extends in a cantilevered fashion over the upper end of the back frame in a spaced distance from the back frame, wherein when the occupant in the seat leans into the upper portion of the compliant back, the upper portion can flex about the pivot until contacting the upper end of the back frame. Another embodiment of the vehicle seat includes side bolsters coupled to the first and second side members of the back frame and extend from the side members. A further embodiment of the vehicle seat provides, the first and second side members coupled to the seat base with a tuberosity pivot at a point aligned with the natural pivot of the seated occupant. An additional embodiment includes one of a manually actuated mechanism and a drive motor coupled to the tuberosity pivot to articulate the movement of the back frame in relation to the seat base. An additional embodiment of the vehicle seat includes a biasing apparatus coupled to the back frame and the compliant back.

There is also provided an automobile seat comprising a base coupled to a support structure of an automobile, a seat supported by the base, a back frame including an upper transverse member, a first side member and a second side member, wherein the upper transverse member interconnects each of the side members in an upper end of the back frame, the back frame further includes a second transverse member coupled to the first and second side members in a spaced distance from the first transverse member, wherein the first and second side members each have a lower end pivotably coupled to the seat and a compliant back operably connected at an upper portion to the second transverse member and operably connected at a lower portion proximate the lower ends of the first and second side members. Another embodiment provides the compliant back being coupled to the second transverse member by at least one pivot member such that the upper portion of the compliant back extends in a cantilevered fashion over the upper end of the back frame in a spaced distance from the back frame, wherein when the occupant in the seat leans into the upper portion of the compliant back, the upper portion can flex about the pivot until contacting the upper end of the back frame. Another embodiment of the automobile seat includes side bolsters coupled to the first and second side members of the back frame and extend from the side members. A further embodiment of the automobile seat provides the first and second side members coupled to the seat base with a tuberosity pivot at a point aligned with the natural pivot of the seated occupant. An additional embodiment includes one of a manually actuated mechanism and a drive motor coupled to the tuberosity pivot to articulate the movement of the back frame in relation to the seat base. An additional embodiment of the automobile seat includes a biasing apparatus coupled to the back frame and the compliant back.

There is further provided an automotive seat comprising a base coupled to a support structure of an automobile with the seat supported by the base. A back frame including an upper transverse member, a first side member and a second side member, wherein the upper transverse member interconnects each of the side members in an upper end of a back frame. The back frame further includes a second transverse member coupled to the first and second side members at a spaced distance from the first transverse member, wherein the first and second side members each have a lower end pivotably coupled to the seat. A compliant back is operatively connected in an upper portion to the second transverse member by at least one pivot member such that the upper portion of the compliance back extends in a cantilevered fashion over the upper end of the back frame in a spaced distance from the back frame and operably connected at a lower portion proximate the lower ends of the first and second side members. When an occupant in the automotive seat leans into the upper portion of the compliant back, the upper portion can flex about the pivot until contacting the upper end of the back frame and upon flexure of the occupant's spine and lower back. The compliant back is configured to flex sympathetically and follow flexure of the seated occupant's back and spine. Another embodiment of the automotive seat provides where the first and second side members are each coupled to the seat base with the tuberosity pivot at a point aligned with the natural pivot of the seated occupant. An additional embodiment includes one of a manually actuated mechanism and a drive motor coupled to the tuberosity pivot to articulate the movement of the back frame in relation to the seat base. An additional embodiment of the automotive seat includes a biasing apparatus coupled to the back frame and the compliant back.

BRIEF DESCRIPTION OF THE DRAWINGS

FIG. 12 is a partial view of an exemplary embodiment of the vehicle seat detailing the lower portion of the compliant back member and an embodiment of a biasing mechanism.

DETAILED DESCRIPTION OF EXEMPLARY EMBODIMENTS

Before beginning the detailed description of an exemplary embodiment, several general comments are warranted about the applicability and the scope of the present invention.

First, the illustrations relate to a seat (also can be referred to as a chair) particularly adapted for motor vehicles, such as cars, SUVs, vans, trucks, buses and the like, but the invention is applicable also to seating used in aircraft, railroad vehicles, nautical vehicles or other environments.

Second, the seat of the present invention is illustrated in the first few FIGURES as a padded seat having certain contours, trim and the like. While this configuration is presently preferred, a wide variety of seat configurations and appearances will benefit from use of the mechanical support and movement mechanisms described in connection with the later FIGURES. Also the exterior of the seat can be covered by fabric, vinyl, leather or other materials known and used in the seating art.

Third, with regard to the seat described later herein, substantial modifications can be made without departing from the invention's intended scope. For example, while certain mechanical systems are described to move seat components to achieve certain results, other mechanisms, manual or powered could be substituted therefore. For example, where a screw drive is used in moving the thorax pivot location, other mechanical equivalents including, but not limited to, four bar linkages, air or hydraulic cylinders, air bladders, rack and pinion systems, cams and cables, gears, etc. could be employed. Another example is that for a pelvis support, i.e., a pair of clam-shell like devices (which are themselves already known in the art). They could be replaced by other known or subsequently developed support mechanisms. These mechanisms do not, in and of themselves, form part of the present invention, but-when combined with the other pivot, support, rotation and moving mechanisms define the invention and result in more comfortable seating for the occupant.

Figure 1:
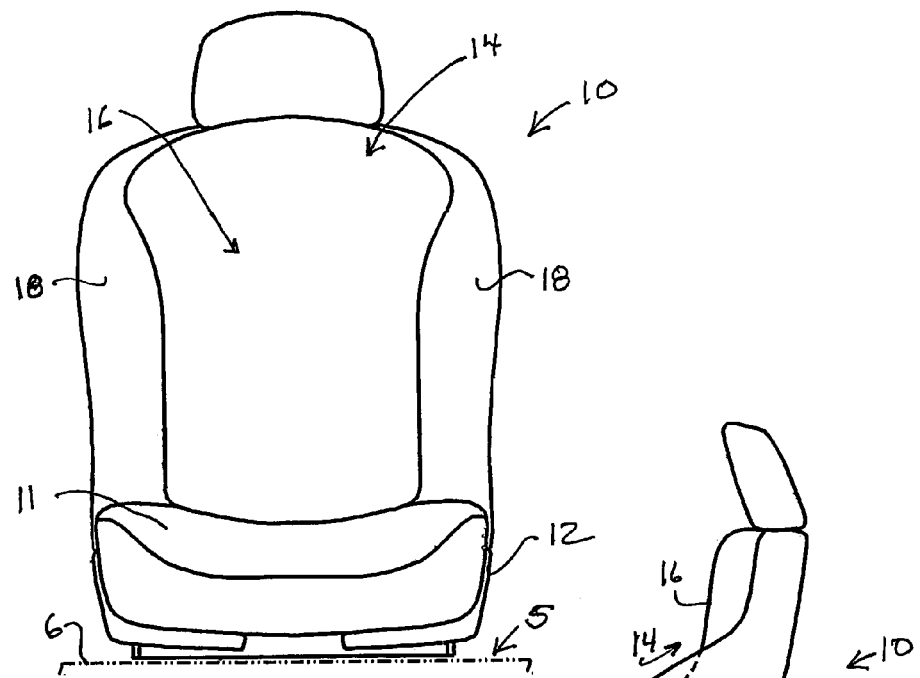
FIG. 1 is a front view of an exemplary embodiment of a vehicle seat.
Figure 2:
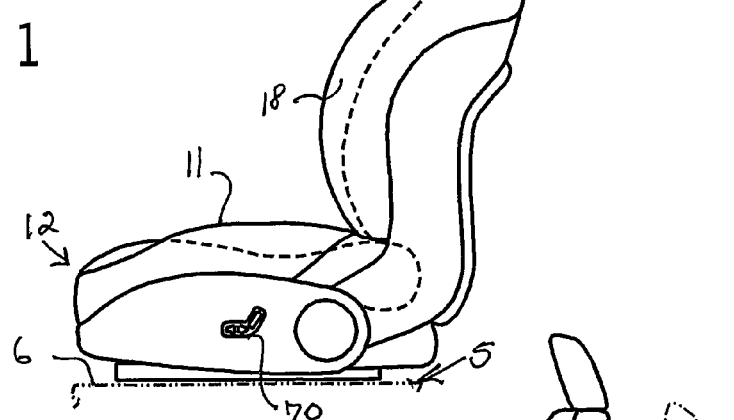
FIG. 2 is a side view of an exemplary embodiment of a vehicle seat.
Figure 3:
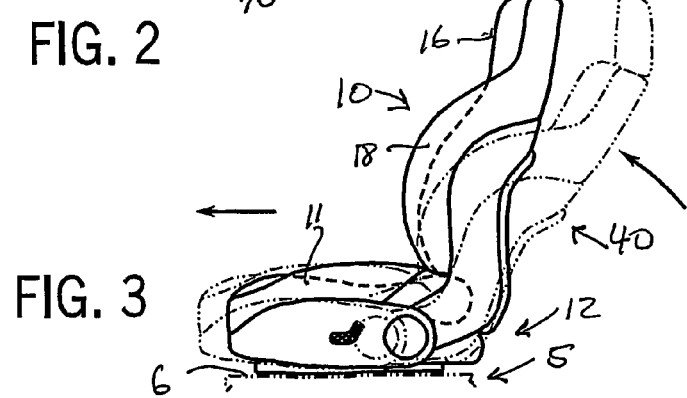
FIG. 3 is a side view of an exemplary embodiment of the vehicle seat illustrated in FIG. 2 depicting proportionate movement of the back in relation to the seat.
Figure 4:
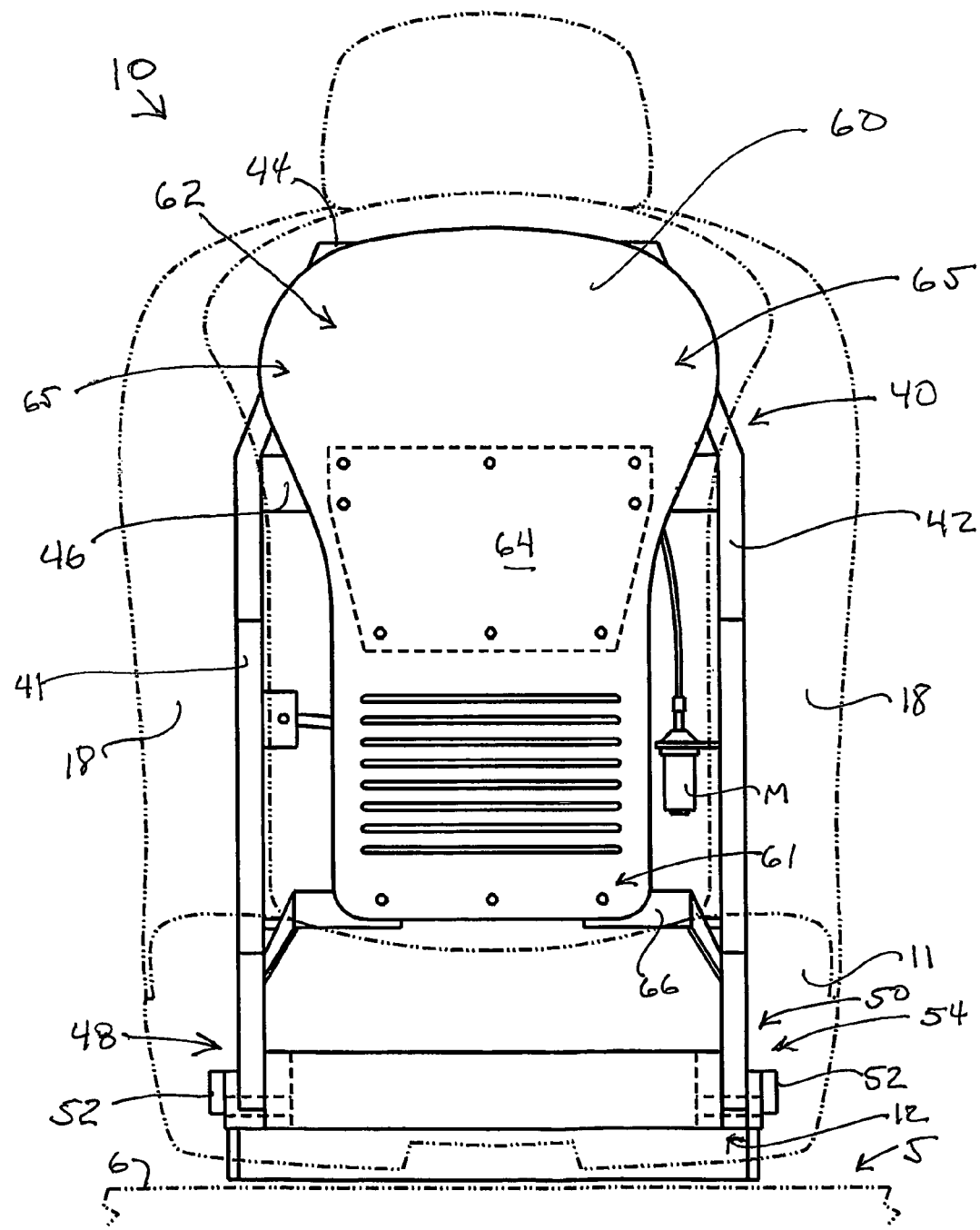
FIG. 4 is a front view of an exemplary embodiment of a vehicle seat with the cushions removed.

Referring generally to the Figures and in particular to FIGS. 1–3 there is shown a vehicle seat 10 for use in a vehicle 5 of any known type. The vehicle seat 10 includes a seat base 12 which supports a cushioned seat 11 and a seat back 14 pivotally connected to the seat base 12. The seat 10 can be either a manually adjustable seat or may be provided with electric motors to provide automated adjustment and electronic control of the seat. Such manipulation can be accomplished by the use of a change of position mechanism 70 coupled to the back frame 40 and seat base 12. The change of position mechanism provides for the back frame 40 to move in proportional relation to the seat be 12 at a determined ratio, for example moving the seat 11 one and a half millimeter per degree of back frame 40 movement. An example of a control system is disclosed in U.S. Provisional Application No. 60/356,277 entitled "Vehicle Seat Having An Electronic Control System" to Cussen et. al., filed on Feb. 12, 2002 and in U.S. Provisional Application No. 60/356,836 entitled "Automotive Seat With Live Back" to Hancock et al., filed on Feb. 12, 2002, which are incorporated by reference herein. The seat 10 is connected to the floor of the support structure 6 of a vehicle 5 in any of a variety of configurations or designs which allow for the movement and adjustment of the seat 10 within the vehicle 5. The vehicle seat 10 may optionally include a headrest which may also be adjustable with respect to an occupant of the seat 10 such as any known or appropriate headrest.

The seat back 14 of the vehicle seat 10 preferably includes a central portion cushion 16 and a pair of side bolsters 18 positioned on the sides of the cushion 16. The cushion 16 is preferably contoured to receive and support the back of an occupant of the vehicle seat 10. The side bolsters 18 are also preferably aligned with respect to the cushion 16 and contoured to provide an angled, gradual support of the lateral side portions of an occupant O of the vehicle seat 10. (See FIGS. 6 and 7) The cushion 16 and side bolsters 18 preferably include a foam material (not shown) and a cover of any appropriate or known material such as cloth, vinyl, leather, etc. The cushion 16 and bolsters 18 include support frames as more fully described below.

The seat back 14 further includes a back frame 40 including a cover of any appropriate or known material such as cloth, vinyl, leather, etc. and which preferably matches the cover material of the seat 11, back cushion 16, side bolsters 18 and seat base 12. However, it should be understood that a different material may be used on any element.

Referring now to FIGS. 4–12, there is shown exemplary embodiments of the type of the vehicle seat 10 of FIGS. 1–3 with the cover material and foam cushions removed. The back cushion 16 includes a compliant back member 60 as more fully described below. The back frame 40, with the cover removed, includes a back frame member 42 consisting of a first side member 41 and a second side member 43.

Referring also to FIGS. 4, 5, 6 and 7, the lower ends 48, 50 of the first and second side members 41 and 43, respectively, are preferably pivotally attached to the seat base 12 at a tuberosity pivot 52 intended to be aligned with the natural pivot of the seated occupant, typically the ischial tuberosities of the seated occupant which is a point a spaced distance from the hip flexor point HF (or h-point) of the occupant O of the seat 10. The entire seat back 14, including the back frame 40, seat cushion 16 and side bolsters 18, preferably pivots at the tuberosity point 54.

Figure 9:
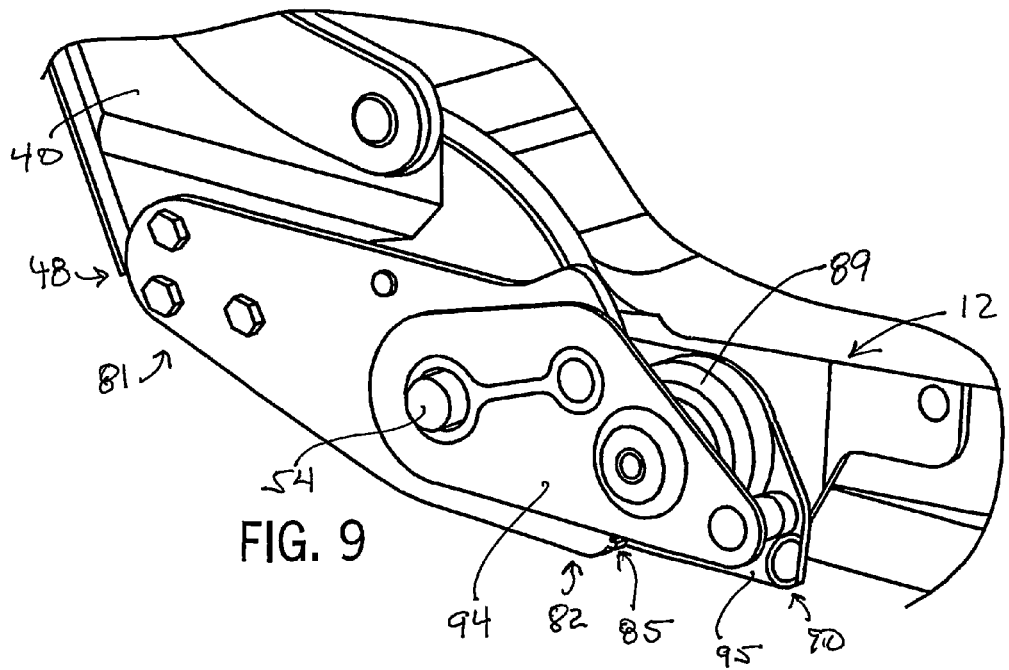
FIG. 9 is a partial view of the apparatus depicted in FIG. 9 and illustrating a cover plate over the gear train.
Figure 10:
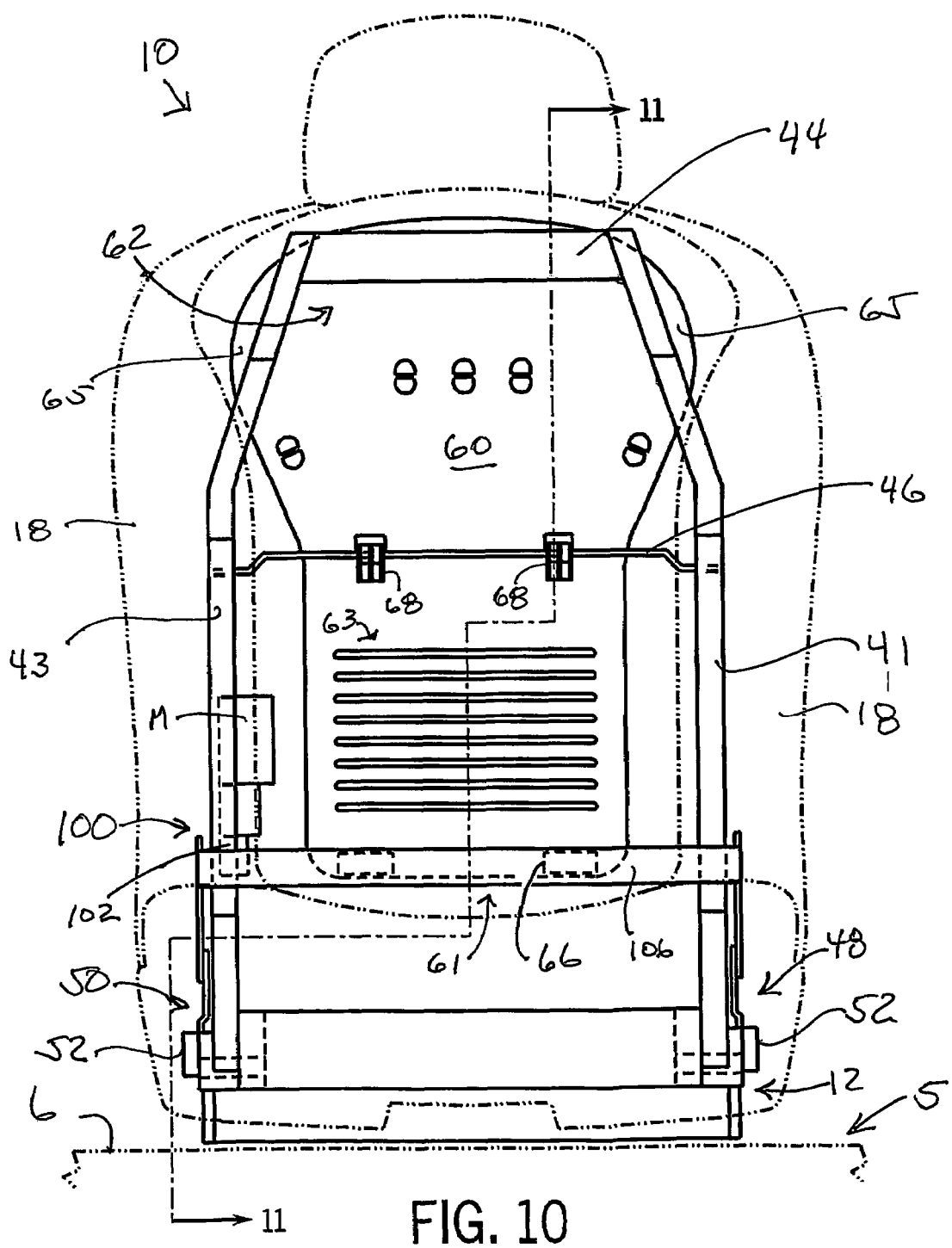
FIG. 10 is a plan view of the back of an exemplary embodiment of a vehicle seat with the cushion removed and including another embodiment of a biasing mechanism.
Figure 11:
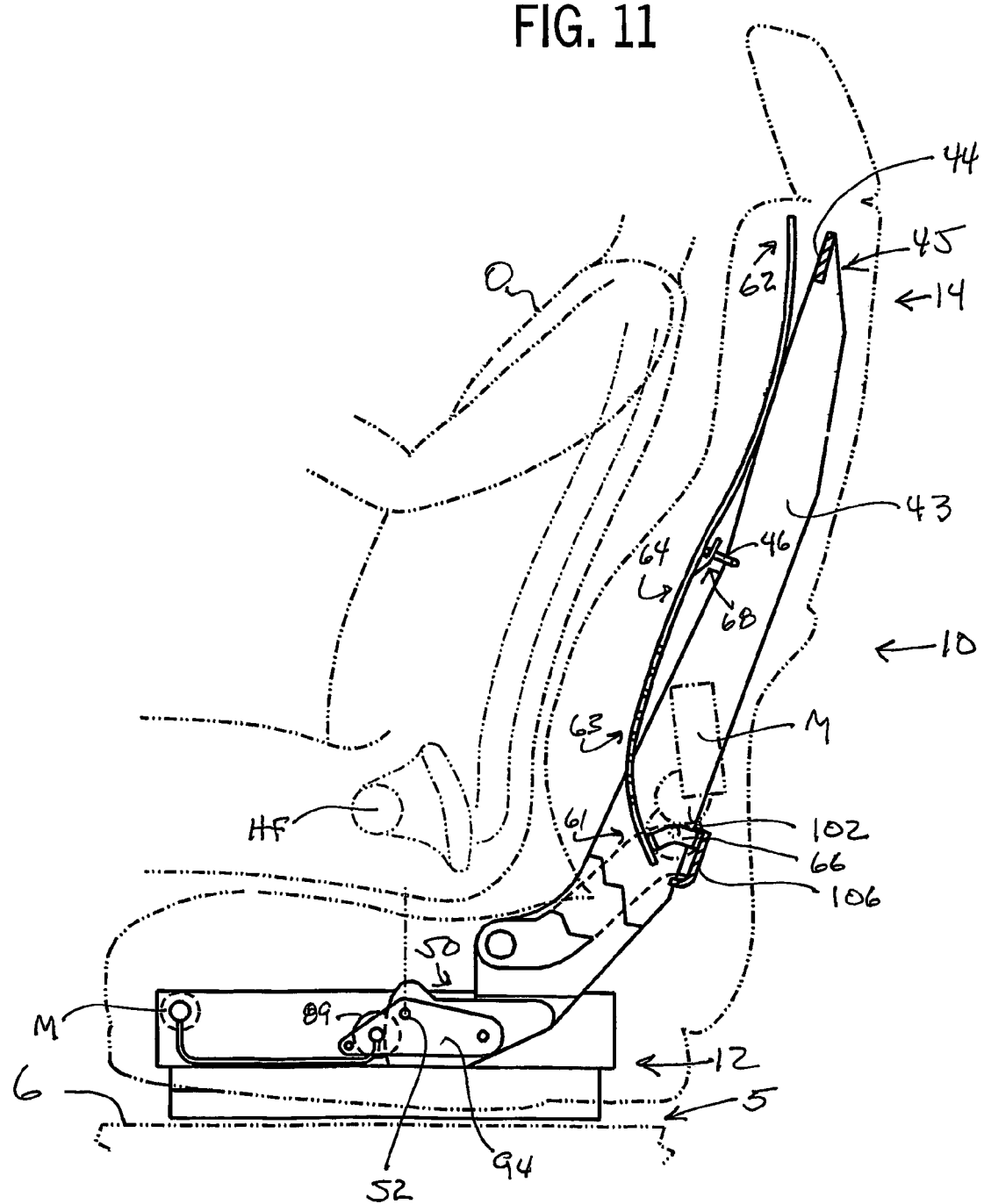
FIG. 11 is a sectional side view of the vehicle seat illustrated in FIG. 10 along the line 11—11.

An embodiment of the vehicle or automotive seat 10 includes one of a manually actuated mechanism and an electric drive motor M coupled to the tuberosity pivot 54 to articulate the movement of the back frame 40 in relation to the seat base 12. Tuberosity pivot 54 may be of any convenient design that effects rotation of seat back 14 relative to the seat base 12. The drive motor M can be coupled directly to the tuberosity pivot 54 or coupled through a gear train. Referring to FIGS. 6–7 and 8–9, there is illustrated an exemplary embodiment of the latter arrangement. A sector plate 80, having a first end 81 and a second end 82, is configured to pivot about the tuberosity pivot point 54. The first end 81 of the sector plate is coupled to the back frame 40, for example at the lower end of the side members 48, 60. The second end 82 of the sector plate 80 is configured with sector teeth 85. The sector plate may also define a stop slot 83 to limit the travel of the back frame 40. The stop slot 83 slidingly engages a stop pin 87 mounted on the seat base 12. A planetary gear set 89 is coupled to the drive motor M and has a drive gear 92 configured to engage the sector teeth 85 of the sector plate 80. A worm gear 90 engages the planetary gear set 89 which is driven by an electric motor M coupled to the worm gear 90. The planetary gear set 89 and the worm gear 90 may be housed in a common gear housing 95 as illustrated in FIGS. 9 and 10. A cover plate may be provided to shroud the gear engagements. The electric motor M and appropriate controls are connected to the vehicle seat 10 control panel and configured to provide the predetermined motion as discussed above.

The word "compliant" is used herein as intended to refer to the flexibility of the present back especially in the lumbar area or a back structure that provides the equivalent of that flexibility, and the present back shell system is compliant and designed to work sympathetically with the human back. The word "sympathetically" is intended to mean that the back moves in close harmony with a seated user's back and posturally supports the seated user's back as the chair back is reclined and when a seated user flexes his/her lower back. The back has three specific regions, as does the human back, those being the thoracic region, the lumbar region and the pelvic region.

The compliant back member 60 includes a lower portion 61, an upper portion 62 and a slotted, flexible portion 63 intended to be aligned with and conform to the lower back portion of an occupant of the seat 10. The compliant back member 60 further includes a middle portion 64 located between the lower portion 61 and upper portion 62. Expanded side portions 65 extend from the middle portion 64 and the upper portion 62 above the side bolsters 18 and are intended to support the upper back and extremities of an occupant of the vehicle seat 10.

The compliant back member 60 together with the cushioning forms a back support for a seated occupant O that is particularly comfortable and sympathetic to back movement of the seated occupant particularly in the lumbar area of the back of the occupant O. The adjustment features on the assembly provide further comfort and allow a seated occupant O to customize the seat 10 to meet his/her particular needs and preferences in the upright through reclined positions. A variety of constructions are contemplated for the back frame 40 and the compliant back 60 and accordingly, the examples should not be limited to only one particular style or material. For example, the back frame 40 could be entirely metal, plastic or a combination thereof. Also, the internal reinforcement, and transverse members 44, 46, could be tubular, a wire, angle iron or a stamping. The compliant back can be formed as an integral, single piece or a combination of parts that are bonded together such as with epoxy, adhesive, fasteners or the like. The compliant back can be constructed from a suitable material that will provide the anticipated support for an occupant O and can be metal or plastic or suitable composite material. The compliant back member 60 may be provided with attachment points, for example hooks, tabs or orifices, to facilitate placement and attachment of trim components.

The lower portion 61 of the compliant back member 60 includes a connecting member or belt 66 for pivotally connecting the lower portion 61 with respect to the lower ends 48, 50 of the first and second side members 41 and 43 of the back frame 40.

The upper end 45 of the back frame 40 includes the first and second side members 41 and 43 of the back frame 40 connected or interconnected using a first transverse member 44. A second transverse or cross member 46 a spaced distance below and downward from the first transverse member 44 and aligned with the middle portion 64 of the compliant back member 60 also connects or interconnects the first and second side members 41 and 43 of the back frame 40.

A preferred embodiment of the second transverse member 46 is a wire that extends between the two side members 41, 43 of the back frame 40. Suitable anchors are provided at each end of the second transverse member 46 to couple the second transverse member 46 like a wire, to each side member 41, 43.

Figure 5:
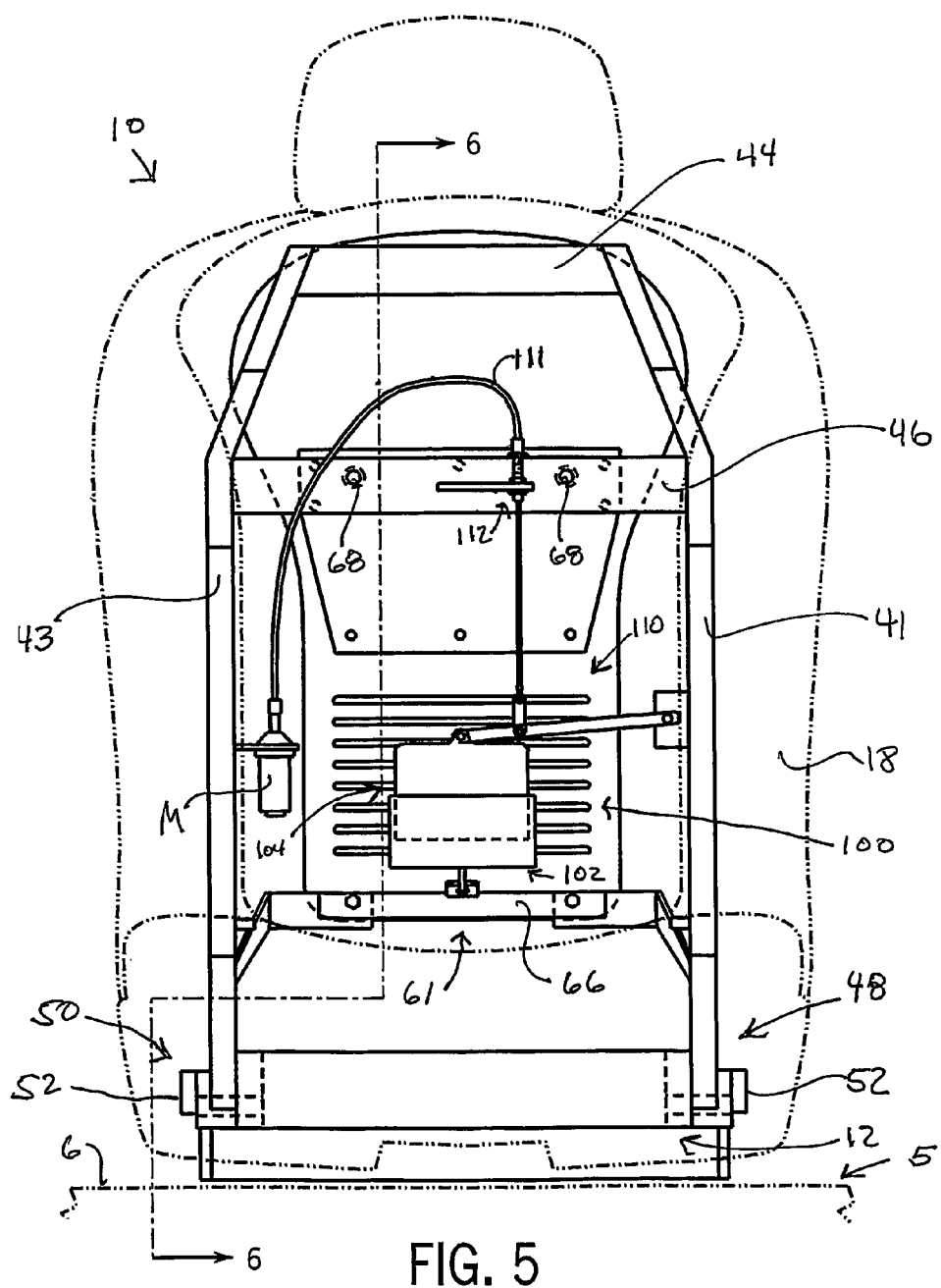
FIG. 5 is a plain view of the back of the vehicle seat depicted in FIG. 4 with the cushions removed.
Figure 6:
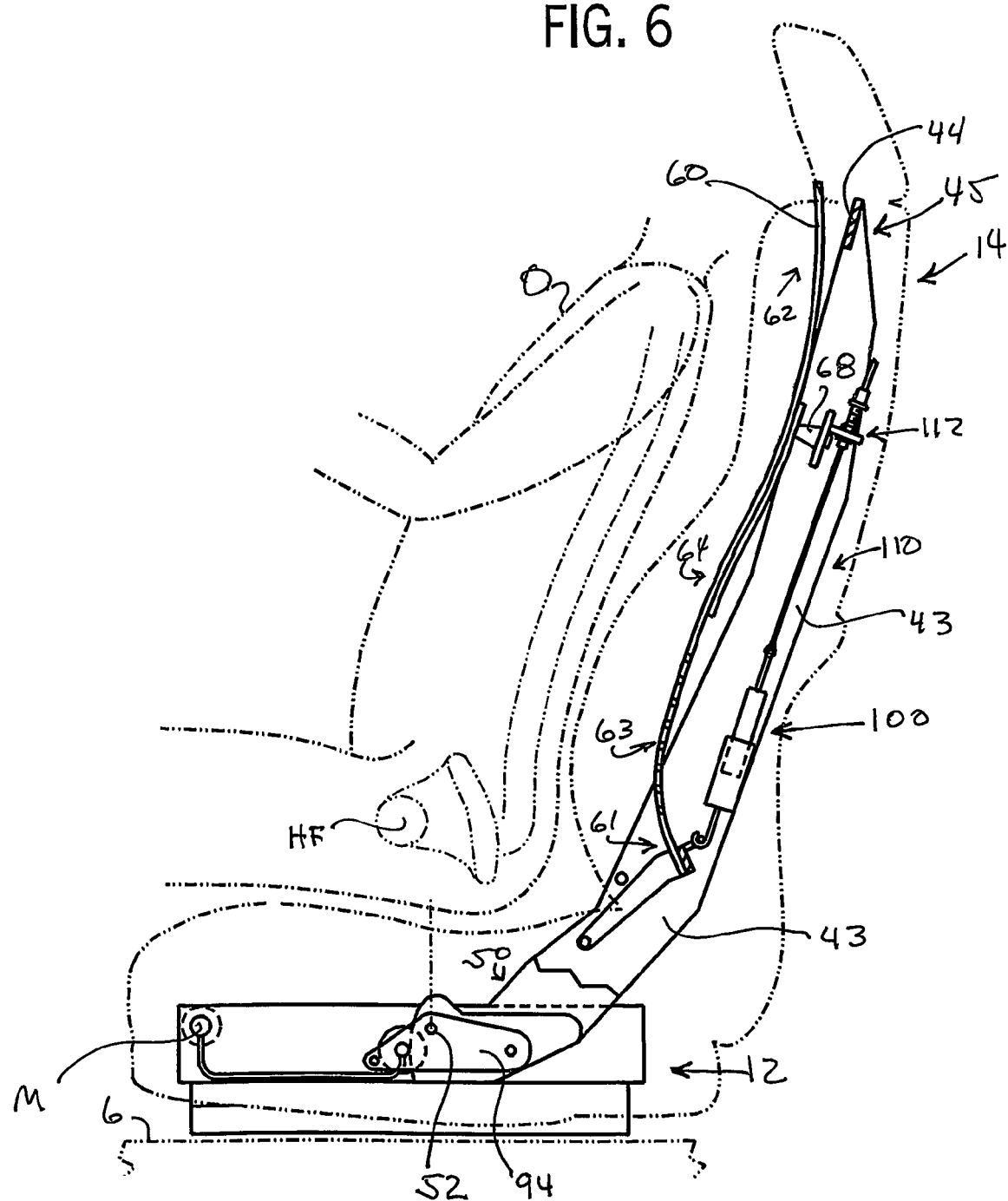
FIG. 6 is a sectional side view of an exemplary embodiment of the vehicle seat show in FIG. 5 along the lines 6—6, illustrating the connection of the compliant back with the back frame and related apparatus.

The compliant back member 60 is pivotally attached at a pair of pivots 68 to the second transverse member 46 as shown in FIGS. 5 and 6 such that the upper portion 62 and the side portions 65 of the compliant back member 60 extends in a cantilevered fashion over the upper portion of the back frame 40 and spaced therefrom. Thus, when an occupant leans into the upper portion 62 of the compliant back 60, the upper portion 62 may flex about the pivots 68 until they encounter the upper part 45 of the back frame 40 or the first transverse member 44. A preferred embodiment provides hooks molded or attached to the compliant back member 60, with the hooks engaging in a wire type second transverse member 46 described above.

Figure 7:
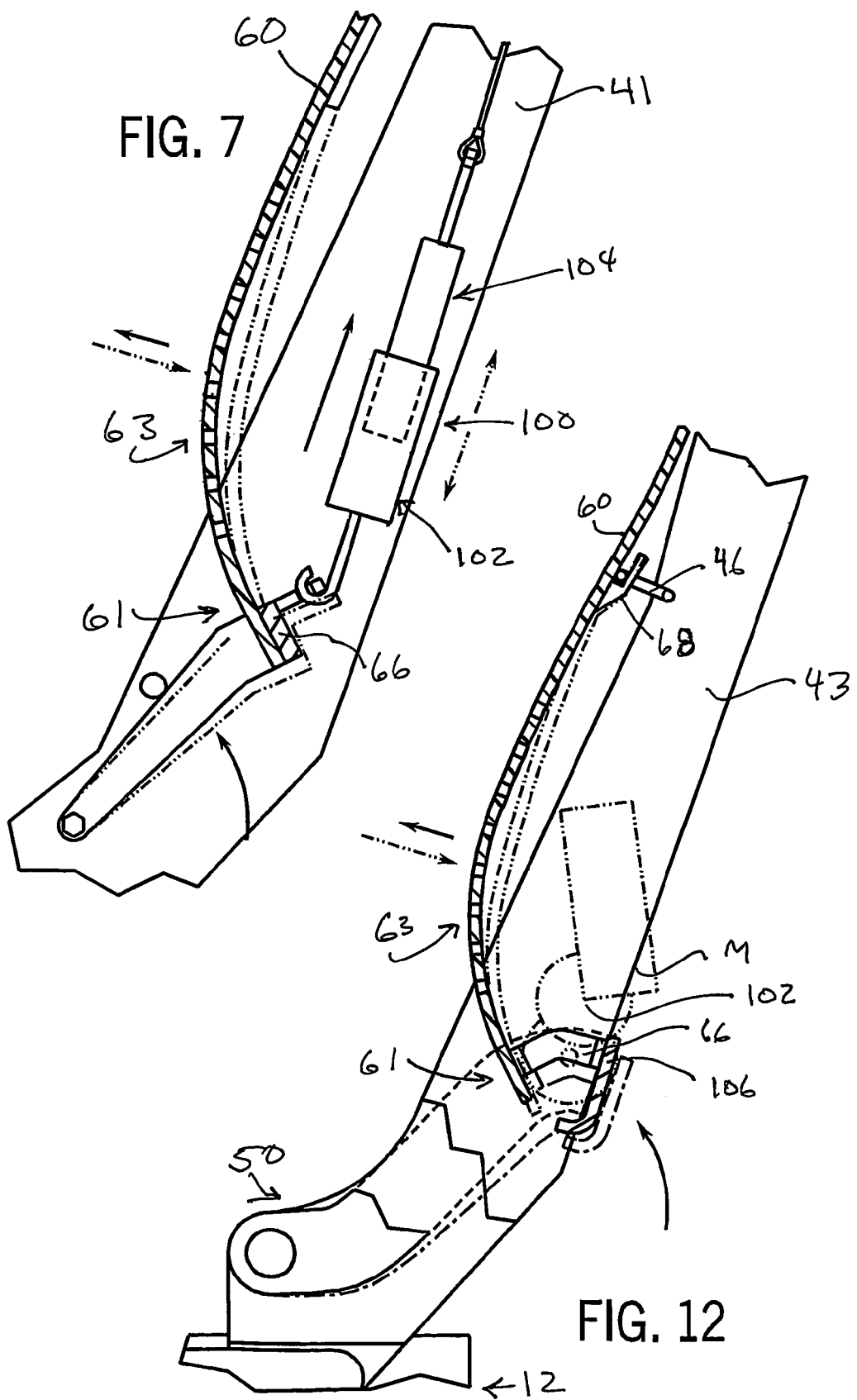
FIG. 7 is a partial view of an exemplary embodiment of the vehicle seat detailing the compliant back and an embodiment of a biasing mechanism.
Figure 8:
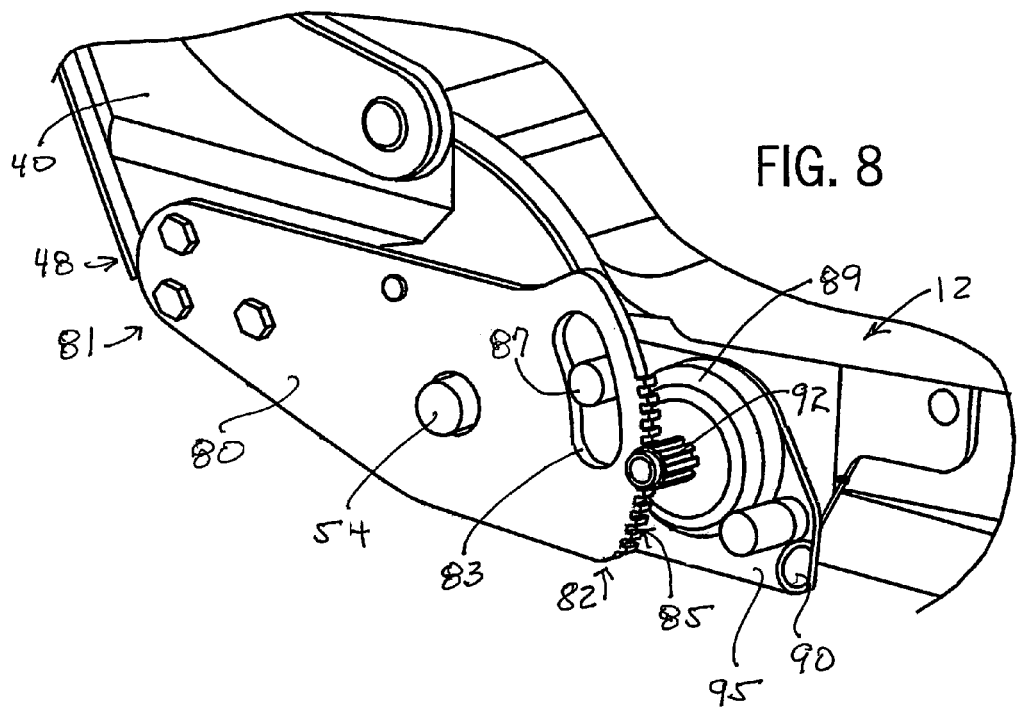
FIG. 8 is a partial view of an exemplary embodiment of a vehicle seat illustrating a motor driven gear train coupled to a tuberosity pivot for movement of the back frame in relation to the vehicle seat.

Referring now to FIGS. 5–7, there is shown the vehicle seat 10 including a biasing apparatus 100. The biasing apparatus 100 operates to bias the lower portion 61 of the compliant back member 60 about the end pivot points of the connecting member belt 66 connected to the first and second side members 41 and 43, respectively, of the back frame 40. The biasing apparatus 100 at its top portion is connected to at least one of the side members 41, 43 of the back frame 40. The biasing mechanism 100 preferably includes at least one biasing member 102, which is initially activated when force is applied to the compliant back member 60 such as when an occupant O sits in the vehicle seat 10.

The biasing apparatus 100 may further include a second biasing member 104, having a different and preferably higher biasing rate than the first biasing member 102. The second biasing member 104 is operatively activated when sufficient force is applied to the compliant back member 60 in the region of the slotted portion 63.

The biasing apparatus 100 is preferably adjustable and may include a biasing member adjuster 110 which may include a cable 111 and anchor 112 for moving the upper end of the biasing apparatus 100 and adjusting the amount of tension or reactive force to oppose occupant loading forces tending to push the compliant back 60 lower portion 61 downward to effect the amount of lower back tension within the compliant back member 60. The first and second biasing members 102, 104 may be hydraulic, pneumatic or mechanical devices configured to provide the necessary tension adjustment in the compliant back member 60. The adjuster 110, may be operated by a manual system or by an electric motor coupled to the adjuster 110, with convenient and conventional controls.

The purpose of the biasing apparatus 100 is to allow each occupant to tailor both the curvature and opposing force of the compliant back member 60 to the occupant's back surface. The compliant back member 60 is not a static device, and dynamically adjusts to the occupant's posture to maintain contact and support. The occupant optimizes the portion of the compliant back 60 with the biasing apparatus 100.

An alternative and preferable embodiment of the biasing apparatus 100 (See FIGS. 10–12) includes at least one biasing member 102, such as a clock spring, coupled to the back frame 40 and the lower portion 61 of the compliant back member 60 to provide tension adjustment to the compliant back member 60. The biasing member 102 provides a controllable force for moving the lower portion 61 of the compliant back member 60 in relation to the occupant of the seat 10. A second clock spring may be provided at the opposite side of the vehicle seat 10 from the first biasing member 102. A crosstalk member 106 coupled to at least one of the biasing members 102, 104 and the lower portion 61 of the compliant back member 60 may also be provided. An electric motor M can be used to adjust the tension with the motor controls placed in any convenient position for use by the occupant of the vehicle seat 10. A manual adjuster 110 may also be used.

Another alternative embodiment for the biasing apparatus 100 includes a guide member coupled to each side member 41, 43 of the back frame 40, with the guide member positioned with one end higher than the other end. The lower portion 61 of the compliant member 60 is configured, for example with a pair of protrusions, to engage the guide members, or is coupled to a guided member aligned within each guide member. Movement of lower portion 61 of the compliant back member 60 is facilitated by a biasing apparatus 100 configured to provide a controllable force for moving the lower portion 61 of the compliant back member 60. The biasing apparatus 100 can be coupled to one of the guide members and lower portion 61 of the compliant back member 60. The biasing apparatus 100 can be adjusted by an adjuster 110 either manually or by a suitable electric motor. Movement along the guide member, causes the lower portion 61 of the compliant back member 60 to move along a trajectory, preferably a circular trajectory, which dynamically adjusts to the occupant seated in the vehicle seat 10.

While the drawings and examples described herein include various exemplary embodiments, they serve the purpose of illustrating the invention only. The inventions disclosed are not limited to the specific forms shown. The systems and methods depicted and described are not limited to the precise details and conditions disclosed. Furthermore, other substitutions, modifications, changes, and omissions may be made in the design, operating conditions, and arrangements of the exemplary embodiments without departing from the scope of the invention as expressed in the appended claims.

What is claimed is:

1. A vehicle seat for use by an occupant in a vehicle including a support structure, the vehicle seat comprising:
    a seat base coupled to the support structure of the vehicle;
    a back frame including an upper transverse member, a first side member and a second side member, wherein the upper transverse member interconnects each of the side members at an upper end of the back frame, the back frame further includes a second transverse member coupled to the first and second side members a spaced distance from the first transverse member, wherein the first and second side members each have a lower end pivotally coupled to the seat base; and
    a compliant back operably connected at an upper portion to the second transverse member and operably connected at a lower portion proximate the lower ends of the first and second side members,
    wherein the compliant back is coupled to the second transverse member by at least one pivot member such that the upper portion of the compliant back extends in a cantilevered fashion over the upper end of the back frame and a spaced distance from the back frame, wherein when the occupant in the seat leans into the upper portion of the compliant back, the upper portion can flex about the pivot until contacting the upper end of the back frame.

2. The vehicle seat of claim 1, including at least one additional pivot member located a spaced distance from the other pivot member and coupled to the compliant back and the second transverse member.

3. The vehicle seat of claim 1, wherein the lower portion of the compliant back is coupled to a connecting member which couples to the two side members proximate the lower ends of the side members.

4. The vehicle seat of claim 1, including a side bolster, with one side bolster coupled to each of the first and second side members of the back frame and extended from the side members.

5. The vehicle seat of claim 4, wherein the side bolsters are aligned with the compliant back such that the compliant back can be moved clear of the side bolsters.

6. The vehicle seat of claim 5, wherein the compliant back includes a slotted, flexible portion and expanded side portions configured to extend above the side bolsters to support the upper back and extremities of the occupant of the seat.

7. The vehicle seat of claim 1, wherein the first and second side members are each coupled to the seat base with a tuberosity pivot at a point aligned with the natural pivot of the seated occupant.

8. The vehicle seat of claim 7, including one of a manually actuated mechanism and a drive motor coupled to the tuberosity pivot to articulate the movement of the back frame in relation to the seat base.

9. The vehicle seat of claim 8, further comprising:
a sector plate, having a first end and a second end, configured to pivot about the tuberosity point, with the first end of the sector plate coupled to the back frame and the second end configured with sector teeth, and
a planetary gear set coupled to the drive motor and having a drive gear configured to engage the sector teeth of the sector plate.

10. The vehicle seat of claim 1, including a biasing apparatus coupled to the back frame and the compliant back.

11. The vehicle seat of claim 10, wherein the biasing apparatus is coupled to at least one of the side members and the lower portion of the compliant back.

12. The vehicle seat of claim 10, wherein the biasing apparatus includes an adjuster to vary the tension in the biasing member to effect tension in the compliant back.

13. The vehicle seat of claim 10, wherein the biasing apparatus includes at least one biasing member.

14. The vehicle seat of claim 13, wherein the biasing member is a spring.

15. The vehicle seat of claim 1, wherein the vehicle seat is an automobile seat.

16. The vehicle seat of claim 1, including a change of position mechanism coupled to the back frame and seat base, wherein the back frame is moved in proportional relation to the seat base at a pre-determined ratio.

17. The vehicle seat of claim 16, wherein the change of position mechanism includes at least one electric motor.

18. An automotive seat for use in an automobile having a support structure, the automotive seat comprising:
a base coupled to the support structure of the automobile;
a seat supported by the base;
a back frame including an upper transverse member, a first side member and a second side member, wherein the upper transverse member interconnects each of the side members at an upper end of the back frame, the back frame further includes a second transverse member coupled to the first and second side members a spaced distance from the first transverse member, wherein the first and second side members each have a lower end pivotally coupled to the seat; and
a compliant back operably connected at an upper portion to the second transverse member and operably connected at a lower portion proximate the lower ends of the first and second side members,
wherein the compliant back is coupled to the second transverse member by at least one pivot member such that the upper portion of the compliant back extends in a cantilevered fashion over the upper end of the back frame and a spaced distance from the back frame, wherein when an occupant in the automotive seat leans into the upper portion of the compliant back, the upper portion can flex about the pivot until contacting the upper end of the back frame.

19. The automotive seat of claim 18, including at least one additional pivot member located a spaced distance from the other pivot member and coupled to the compliant back and the second transverse member.

20. The automotive seat of claim 18, wherein the lower portion of the compliant back is coupled to a connecting member which couples to the two side members proximate the lower ends of the side members.

21. The automotive seat of claim 18, including a side bolster, with one side bolster coupled to each of the first and second side members of the back frame and extended from the side members.

22. The automotive seat of claim 21, wherein the side bolsters are aligned with the compliant back such that the compliant back can be moved clear of the side bolsters.

23. The automotive seat of claim 21, wherein the compliant back includes a slotted, flexible portion and expanded side portions configured to extend above the side bolsters to support the upper back and extremities of an occupant of the automotive seat.

24. The automotive seat of claim 18, wherein the first and second side members are each coupled to the seat base with a tuberosity pivot at a point aligned with the natural pivot of the seated occupant.

25. The automobile seat of claim 24, including one of a manually actuated mechanism and a drive motor coupled to the tuberosity pivot to articulate the movement of the back frame in relation to the seat base.

26. The automobile seat of claim 25, further comprising:
a sector plate, having a first end and a second end, configured to pivot about the tuberosity point, with the first end of the sector plate coupled to the back frame and the second end configured with sector teeth, and
a planetary gear set coupled to the drive motor and having a drive gear configured to engage the sector teeth of the sector plate.

27. The automotive seat of claim 18, including a biasing apparatus coupled to the back frame and the compliant back.

28. The automotive seat of claim 27, wherein the biasing apparatus is coupled to at least one of the side members and the lower portion of the compliant back.

29. The automotive seat of claim 27, wherein the biasing apparatus includes an adjuster to vary the tension in the biasing member to effect tension in the compliant back.

30. The automotive seat of claim 27, wherein the biasing apparatus includes at least one biasing member.

31. The automotive seat of claim 30, wherein the biasing member is a spring.

32. The automotive seat of claim 18, including a change of position mechanism coupled to the back frame, seat, and base, wherein the back frame is moved in proportional relation to the seat at a predetermined rate.

33. The automotive seat of claim 32, wherein the change of position mechanism includes at least one electric motor.

34. An automotive seat in an automobile having a support structure comprising:

a base coupled to the support structure of the automobile;
a seat supported by the base;
a back frame including an upper transverse member, a first side member and a second side member, wherein the upper transverse member interconnects each of the side members at an upper end of the back frame, the back frame further includes a second transverse member coupled to the first and second side members a spaced distance from the first transverse member, wherein the first and second side members each have a lower end pivotally coupled to the seat; and
a compliant back operably connected at an upper portion to the second transverse member by at least one pivot member such that the upper portion of the compliant back extends in a cantilevered fashion over the upper end of the back frame and a spaced distance from the back frame and operably connected at a lower portion proximate the lower ends of the first and second side members, wherein when an occupant in the automotive seat leans into the upper portion of the compliant back, the upper portion can flex about the pivot until contacting the upper end of the back frame and upon flexure of the occupant's spine and lower back, the compliant back is configured to flex sympathetically and follow flexure of the seated occupant's back and spine.

35. The automotive seat of claim 34, including at least one additional pivot member located a spaced distance from the other pivot member and coupled to the compliant back and the second transverse member.

36. The automotive seat of claim 34, wherein the lower portion of the compliant back is coupled to a connecting member which couples to the two side members proximate the lower ends of the side members.

37. The automotive seat of claim 34, including a side bolster, with one side bolster coupled to each of the first and second side members of the back frame and extended from the side members.

38. The automotive seat of claim 37, wherein the side bolsters are aligned with the compliant back such that the compliant back can be moved clear of the side bolsters.

39. The automotive seat of claim 38, wherein the compliant back includes a slotted, flexible portion and expanded side portions configured to extend above the side bolsters to support the upper back and extremities of an occupant of the automotive seat.

40. The automotive seat of claim 34, wherein the first and second side members are each coupled to the seat base with a tuberosity pivot at a point aligned with the natural pivot of the seated occupant.

41. The automobile seat of claim 40, including one of a mutually actuated mechanism and a drive motor coupled to the tuberosity pivot to articulate the movement of the back frame in relation to the seat base.

42. The automobile seat of claim 41, further comprising:
a sector plate, having a first end and a second end, configured to pivot about the tuberosity point, with the first end of the sector plate coupled to the back frame and the second end configured with sector teeth, and
a planetary gear set coupled to the drive motor and having a drive configured to engage the sector teeth of the sector plate.

43. The automotive seat of claim 34, including a biasing apparatus coupled to the back frame and the compliant back.

44. The automotive seat of claim 43, wherein the biasing apparatus is coupled to at least one of the side members and the lower portion of the compliant back.

45. The automotive seat of claim 43, wherein the biasing apparatus includes an adjuster to vary the tension in the biasing member to effect tension in the compliant back.

46. The automotive seat of claim 43, wherein the biasing apparatus includes at least one biasing member.

47. The automotive seat of claim 46, wherein the biasing member is a spring.

48. The automotive seat of claim 34, including a change of position mechanism coupled to the back frame, seat, and base, wherein the back frame is moved in proportional relation to the seat at a predetermined rate.

49. The automotive seat of claim 48, wherein the change of position mechanism includes at least one electric motor.

* * * * *